R. W. BEENE.
CABLE FEEDER.
APPLICATION FILED SEPT. 30, 1914.

1,177,984.

Patented Apr. 4, 1916.
2 SHEETS—SHEET 1.

Witnesses:
C. Feinle, Jr.
D. W. Foula

Inventor,
R. W. Beene.
By Victor J. Evans,
Attorney.

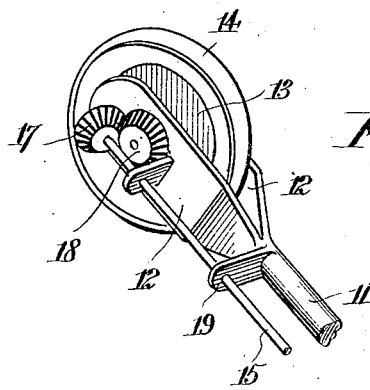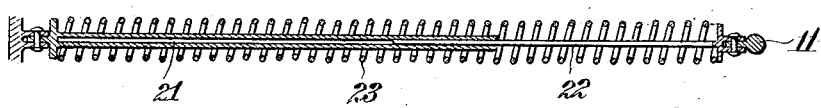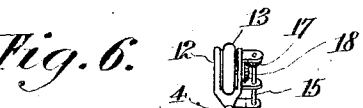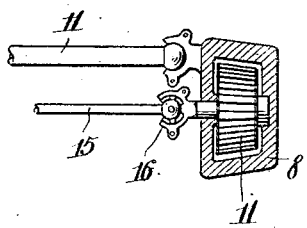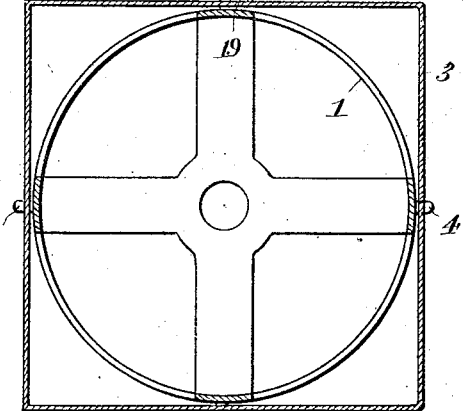

UNITED STATES PATENT OFFICE.

ROBERT W. BEENE, OF TUCSON, ARIZONA.

CABLE-FEEDER.

1,177,984.  Specification of Letters Patent.  Patented Apr. 4, 1916.

Application filed September 30, 1914. Serial No. 864,366.

*To all whom it may concern:*

Be it known that I, ROBERT W. BEENE, a citizen of the United States, residing at Tucson, in the county of Pima and State of Arizona, have invented new and useful Improvements in Cable-Feeders, of which the following is a specification.

The invention relates to a cable feeder designed primarily for feeding cables through underground conduits, the invention comprehending a simple structure which will be readily self-adjusting and self-propelling.

The main object of the present invention is the provision of a cable feeder including a motor having the armature shaft adapted to drive spaced supporting rollers with the latter held under spring tension, so as to frictionally engage the walls of the conduit, whereby to propel the feeder through the conduit.

The invention in the preferred form of details will be described in the following specification, reference being had particularly to the accompanying drawings, in which:—

Figure 1:
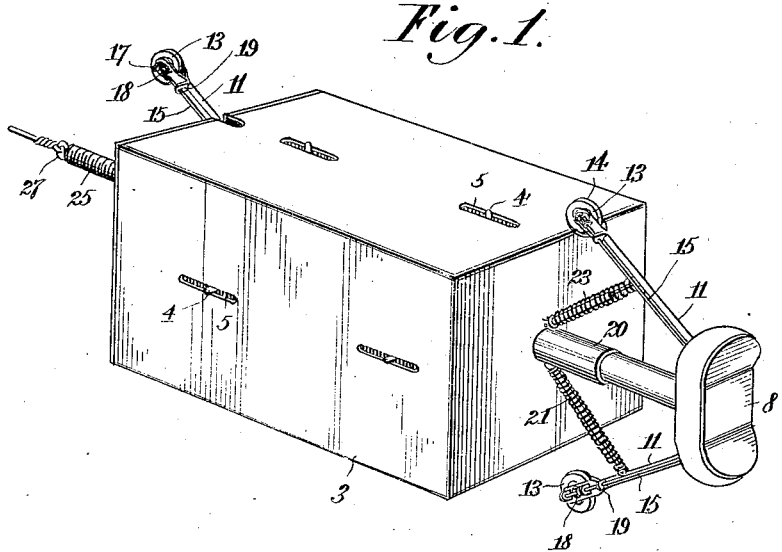
Figure 2:
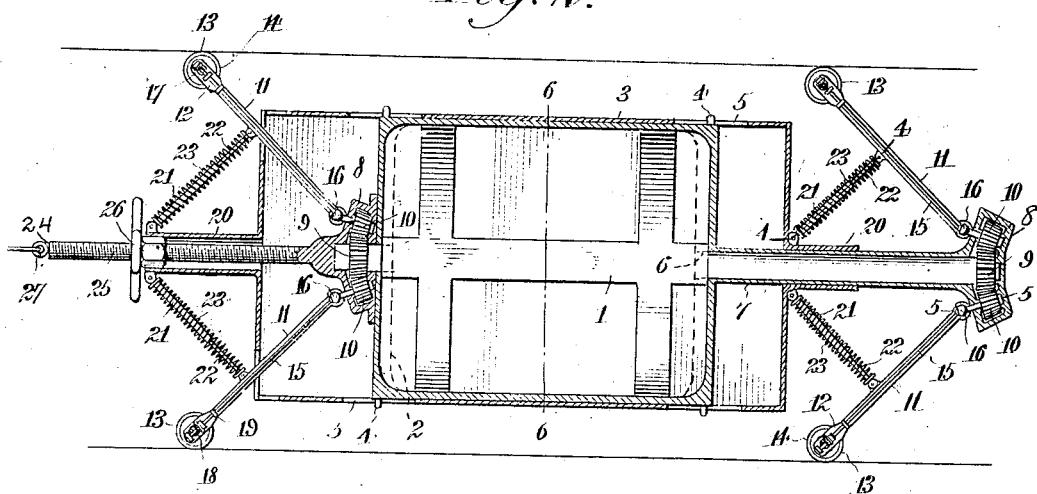

Figure 1 is a perspective view of the improved feeder. Fig. 2 is a longitudinal sectional view of the same, the motor being omitted. Fig. 3 is a perspective detail illustrating the connection of the drive wheels. Fig. 4 is a section on line 4—4 of Fig. 2. Fig. 5 is a broken view in elevation partly in section illustrating the gear case, drive rods and arms connected thereto. Fig. 6 is a section on line 6—6 of Fig. 2.

In the accompanying drawings, the improved feeder comprises a casing 1, in which is rotatably mounted the motor 2, the casing 1 being preferably of skeleton formation and included within a housing 3 which through the medium of pins 4 and slots 5 is slidably mounted with relation to the case. The armature 6 extends in both directions beyond the motor and at what may be termed the forward end is mounted in the sleeve extension 7 from the casing 1. The sleeve extension 7 and the rear wall of the casing 1 are provided with gear cases 8 containing gears 9 mounted upon the armature shaft and coöperating gears 10 driven from the gear 9 and operating the drive wheels in a manner to be later described.

Pivotally connected to the rear wall of each gear case 8 are arms 11, which extend rearwardly from said wall and are terminally formed to provide spaced members 12 between which are mounted drive wheels 13. The wheels are in the form of solid pulleys and are preferably provided with convex rubber tires 14, whereby to provide a more effective grip upon the surface of the conduit. The gears 10 of the respective gear shafts are arranged to operate driving rods 15 through the medium of universal connections 16, the outer or free terminals of the driving rods operating beveled gears 17 meshing with the bevel gears 18 upon the members 12, the driving rods being mounted in bearing projections 19 carried by the arms 11 at appropriate points in the length thereof so as to insure the parts against separation. The drive wheels must be held with sufficient pressure against the walls of the conduit to insure their effective coöperation therewith, and to provide this I arrange upon the housing 3 sleeve extensions 20 to which are secured one section at 21 of telescopic pressure rods, the opposing section 22 of which is connected to the adjacent arm 11. A spring 23 is coiled about each telescopic rod to induce outward pressure upon the arm, as will be evident from the drawings. To provide for adjusting this pressure I secure in an extension of the rear gear case 8 a rod 24 which passes through the sleeve 20 at the rear of the housing, said rod 24 being threaded at 25 and engaged by wing nut 26, which nut is adapted to bear against the end of the sleeve 20. As the telescopic rods travel in the same direction from the housing sleeves, it is obvious that the longitudinal adjustment of the housing will increase or decrease the spread of the arms 11, as may be desired. The terminal of the rod 24 is provided with an eye 27 to which the cable being drawn through the conduit may be attached in any desired manner.

The operation of the apparatus will be fully apparent from the above description, taken in connection with the accompanying drawings, it being understood that in the operation of the gears, the drive wheels are simultaneously rotated in the same direction and having been previously adjusted to frictionally engage the wall of the conduit, with sufficient pressure, rotation of said wheels will feed the device through the conduit drawing the cable therewith.

What is claimed is:—

1. A cable feeder including a casing, a motor therein, conduit engaging drive wheels carried by the casing, means for varying pressure of said wheels against the walls of the conduit.

2. A cable feeder including a case, a motor arranged therein, conduit engaging drive wheels carried by the case and operated by the motor, a housing including the casing, and means carried by the housing for exerting outward pressure upon the drive wheels.

3. A cable feeder including a case, a motor arranged therein, conduit engaging drive wheels carried by the case and operated by the motor, a housing including the casing, and means carried by the housing for exerting outward pressure upon the drive wheels, said housing being adjustable to vary the tension of said means.

4. A cable feeder including a motor containing casing, arms pivotally connected therewith, drive wheels carried by the arms, a housing surrounding the case, spring pressed telescopic rods arranged intermediate the arms, and housing, and means for adjusting the housing to vary the tension on the arms.

In testimony whereof I affix my signature in presence of two witnesses.

ROBERT W. BEENE.

Witnesses:
  WESLEY W. SCHUPP,
  CLAUDE A. MEEK.

Copies of this patent may be obtained for five cents each, by addressing the "Commissioner of Patents, Washington, D. C."